United States Patent

[11] 3,626,932

| [72] | Inventor | Hal C. Becker<br>New Orleans, La. |
|---|---|---|
| [21] | Appl. No. | 766,929 |
| [22] | Filed | Oct. 11, 1968 |
| [45] | Patented | Dec. 14, 1971 |
| [73] | Assignees | Hal C. Becker;<br>Phillip H. Meyers<br>Parish of Orleans, La. |

[54] EKG SYNCHRONIZED X-RAY DOUBLE PULSE EXPOSURE APPARATUS AND METHOD
11 Claims, 3 Drawing Figs.

| [52] | U.S. Cl. | 128/2.06 R, 250/93 |
|---|---|---|
| [51] | Int. Cl. | A61f 5/04 |
| [50] | Field of Search | 128/2.05 M P R, 2.06, 2.1; 250/65, 93 |

[56] References Cited
UNITED STATES PATENTS

| 2,989,051 | 6/1961 | Zuidema et al. | 128/2.05 R |
|---|---|---|---|
| 3,129,704 | 4/1964 | Burt, Jr. | 128/2.1 |

*Primary Examiner*—William E. Kamm
*Attorney*—Cushman, Darby & Cushman

ABSTRACT: Method and apparatus for producing a double exposure X-ray photograph of a heart at two different points during the cardiac cycle by causing an X-ray machine to produce an X-ray burst at a first given point in the cycle and then another burst at a second and different point during the cycle. Also, disclosed is a synchronrizer for detecting the R-wave peak of a person, first means for producing a signal activating the machine at a first given adjustable time after the peak, second means for also activating the machine at a second given adjustable time after the peak, and means for producing and displaying a pulse each time the machine is activated having a duration equal to the inherent time delay between activation and burst production in the machine.

INVENTOR
HAL C. BECKER

BY Cushman, Darby & Cushman
ATTORNEYS

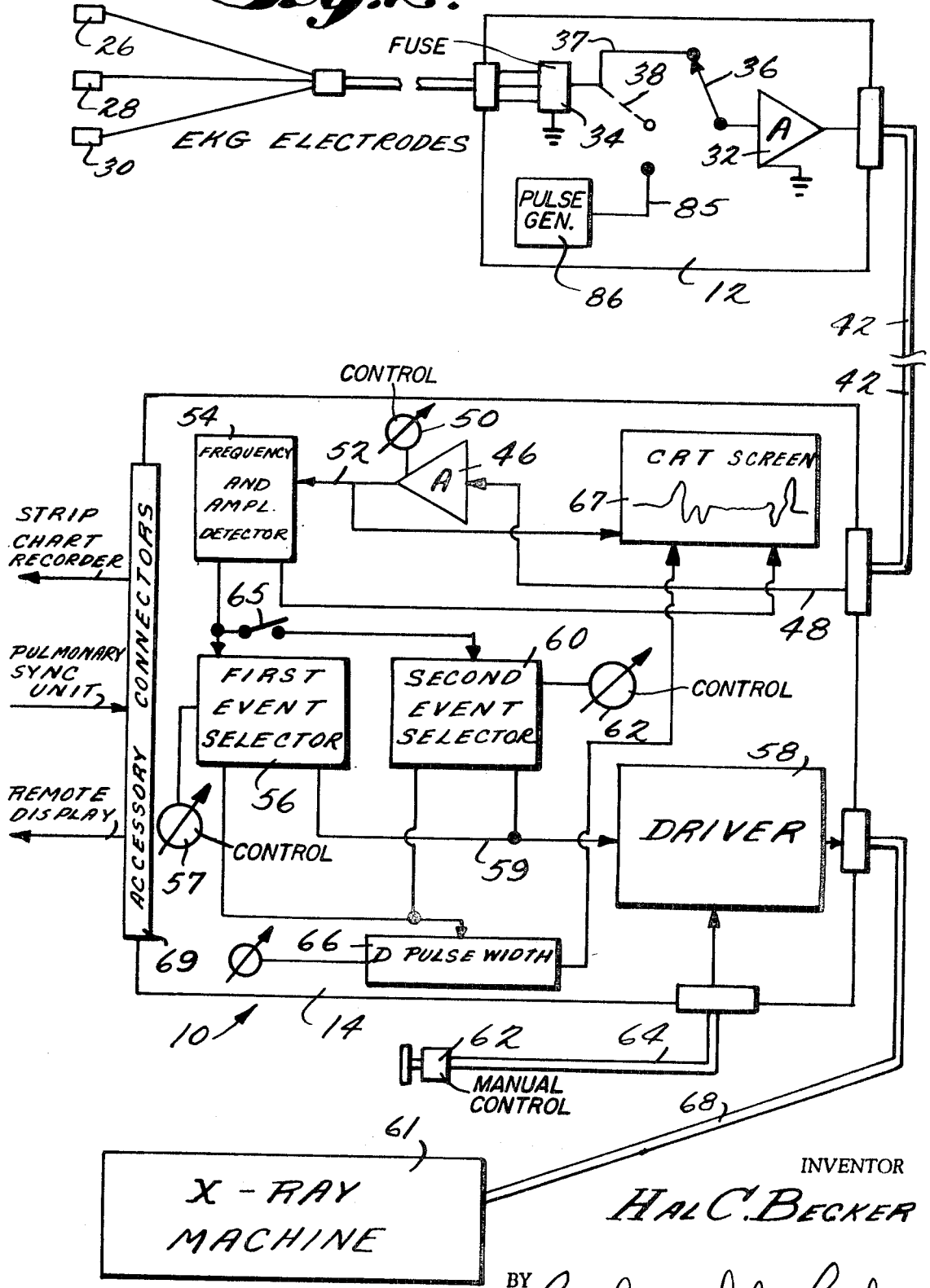

3,626,932

EKG SYNCHRONIZED X-RAY DOUBLE PULSE EXPOSURE APPARATUS AND METHOD

DESCRIPTION OF THE PRIOR ART AND SUMMARY OF THE INVENTION

The invention relates to a method and apparatus for producing a double exposure X-ray photograph of the heart at two different points in the cardiac cycle.

A cardiac synchronizer is a device for causing an X-ray picture to be taken at any predetermined point in the cardiac cycle thereby enabling the clinician to follow changes in the size of the heart of a given patient from time to time in an exact manner and to examine the size of the heart at different points during the cycle. The conventional procedure for taking X-ray pictures is simply to manually activate the X-ray machine whenever the subject is in the desired physical position without reference to the cardiac cycle. Since the heart size may vary as much as two to three centimeters in width between maximum contraction and maximum dilation, it is impossible, with the conventional procedure, to extract any meaningful information relating to changes in heart size over a period of time or during a given cycle by comparing X-ray photographs taken at different times. However, the use of a cardiac synchronizer allows small but significant changes to be detected and evaluated.

Several techniques have been developed for detecting heart disease from such changes or lack of them in the heart size. Once such technique is described in an article entitled "Roentgenographic Exercise Test" in the Oct. 23, 1967 issue of the *Journal of the American Medical Association* and utilizes the two step Master test or a walk of a given distance such as 100 yards. In a normal heart, a decrease in heart diameter after such exercise can be detected by comparing X-ray pictures taken at any given point in the cardiac cycle before and after the exercise, but the heart of most patients with certain types of coronary disease shows either no change at all in heart size or an actual increase in size. Furthermore, this technique is apparently capable of detecting abnormal conditions which no other test can. Therefore, photographing the heart at any given point in the cardiac cycle before exercise and then after exercise can then serve as an effective test to determine the presence of certain abnormal cardiac conditions which might otherwise be undetectable.

One method of photographing the heart at a given point in the cycle used in cardiac synchronizers is to produce an electrical signal delayed for an adjustable time with respect to some prominent characteristic of the electrical waveform produced by the heart, such as the R-wave peak, and use this delayed signal to activate the X-ray machine. However, since a certain amount of time is required between the activating of the X-ray machine and the actual burst of X-rays the total time between the R-wave peak and the actual photographing is the sum of the adjustable delay and the inherent delay in the X-ray machine itself.

In order to illustrate the time at which the actual burst occurs, superimposed upon the cardiac waveform, for example on an oscilloscope, so that the operator can choose the point in the cycle when firing is to occur without actually taking an X-ray, a pulse having a time width equal to the inherent delay can be produced and displayed. The leading edge of this pulse then represents the instant at which the X-ray machine is activated and the trailing edge then when the actual burst is produced.

Moreover, certain heart diseases and conditions, such as aortic valvular stenosis, aortic insufficiency, and pulmonary arterial hypertension, have shown characteristics patterns in heart size changes during the cardiac cycle. It is possible that many now undetectable diseases can be found by comparing the heart size at two different points during the cycle such as diastole and systole and recent developments are discussed in a paper by Hipona and Greenspan entitled "Intercalative Chest Roentgenography" which appeared in Radiology, Vol. 82, Pages 304–306, Feb. 1964.

It is of course possible to compare the heart size at two different points in the cardiac cycle by taking two separate X-ray photographs and then carefully measuring the heart size in each. Such a procedure is cumbersome in that detailed measurements of both photographs are required. Moreover, unavoidable errors result from taking two separate photographs. For example, it is impossible to exactly duplicate either the level of inspiration or the body position even if the two photographs are taken only seconds apart and both factors affect the heart size.

One solution to this problem, as set forth below, is to successively cause X-ray bursts to occur at two separated and different points in the cardiac cycle so that a single photograph showing the heart at the two different points is produced. Moreover, the above described single exposure system can be modified to perform this function by simply producing a second electrical signal which is separately adjustable with respect to the R-wave peak and which also triggers the X-ray machine in the same manner as the first signal.

Besides reducing errors and producing a photograph which is convenient and easy to work with, this invention also results in considerable savings in expensive X-ray film and in expensive operating time of the machines and operator. Since only one photograph instead of two is required, only half the amount of film is employed with the invention and, since the operator only has to push his button once to cause both pictures to be taken without resetting the device, the time required to take the comparative photograph is much less than the time required to take two separate photographs.

Other objects and purposes of the invention will become apparent from the following detailed description of the drawings.

BRIEF DESCRIPTION OF THE DRAWINGS

FIG. 2 shows a cardiac X-ray synchronizer with the double exposure apparatus.

DETAILED DESCRIPTION OF THE DRAWINGS

Figure 1:
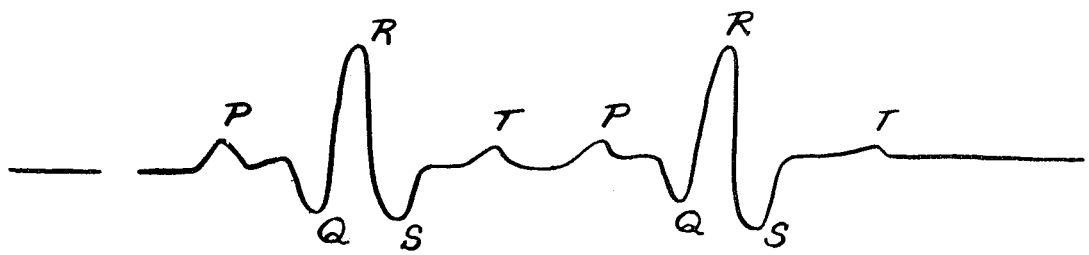
FIG. 1 shows the electrical signals produced by the act of the heart pumping the blood and detected by attaching electrodes to the body.

Reference is now made to FIG. 1 which shows the waveform of the electrical signals produced by the heart during a complete cycle, along with the conventional letter representations of the prominent characteristics. Diastole normally occurs upon the trailing edge of the R-wave peak, and systole upon the trailing edge of the T-wave Since the R-wave peak represents the maximum amplitude of the signal produced, and is particularly distinctive, it is convenient to utilize it as a reference point from which the time to any other point in the cycle can be measured, and this arrangement is preferred for this embodiment. However, any of the other characteristics of the cycle can alternately be used as such a reference if desired.

Reference is now made to FIG. 2 which shows an X-ray synchronizer 10 made up of a preamplifier unit 12 and a control unit 14, each of which are disposed in a separate cabinet. The EKG electrodes 26, 28 and 30 can be placed on the patient as desired but preferably they are affixed to the thorax at the axillary regions (below the armpits) since there is little muscular activity in these areas and therefore practically all muscular displacement artifacts and action potential interferences are eliminated. These electrodes can be quickly and easily affixed to the patient by applying the electrode jelly (or pad) and using adhesive tape over the electrodes to hold them in place. Rubber chest straps can also be used to hold the electrodes in place. Although only two are normally used, the third electrode can be attached to a leg, or other suitable location, if severe external electrical interference is present.

It is important that the patient does not come into contact with any metal objects after the electrodes have been connected, as such contact usually results in electrical artifacts which may disrupt operation. Draping the chest rack, grid, cassette and chin rest with electrically insulating material, such as a disposable plastic pad, a pillow case, sheet, or hospital gown, eliminates such a possibility.

The three electrodes 26, 28 and 30 lead into the preamplifier unit 12 where they are connected to a conventional amplifier 32 via three fuses 34 and a three position switch 36. During normal operation, the switch 36 connects line 37 to the amplifier 32 as shown. However, for those occasional persons whose axis is inverted so that their EKG waveform is the negative of the waveform shown in FIG. 1, an inverted signal is made available on line 38 and switch 36 can be connected to this line in a second position. In a third position, switch 36 can be connected through line 85 to pulse generator 86 so that the synchronizer will operate in a "calibrate," or "test," mode with an exponential spike from the pulse generator substituting for the patient's R-wave.

A cable 42 connects the preamplifier unit 12 with the main control unit 14, which may be mounted on or near the control console of the X-ray machine 61 for easy viewing by the X-ray machine operator. The preamplifier unit 12 may be located on or near the chest film rack so that a cable length of 35 to 50 feet may be necessary.

The signal received in the control unit 14 from the cable 42 is first carried to another amplifier 46 via line 48. The amplifier 46 is equipped with an amplitude control 50 which can be used to adjust the output signal level on line 52 so that the R-wave peak is sufficient to operate the detector 54 and not enough to result in blocking an amplifier 46. This adjustment may be made for each individual subject, preferably during maximum inspiration since the EKG signals produced vary somewhat with different phases of the respiratory cycle. However, the adjustment of amplifier 46 is not critical. The output of amplifier 46 on line 52 is then applied to frequency and amplifier detector 54 which produces a short electrical triggering pulse or other appropriate signal coinciding with the leading edge of the R-wave and eliminates the remainder of the waveform shown in FIG. 1 representing the cardiac cycle.

This short pulse produced by detector 54 is then passed to a first event selector device 56 which delays it for a given and variable amount of time by means of an adjustment control 57 which may be simply a potentiometer making up part of the timing circuit of a monostable multivibrator, and then produces a similar short triggering pulse a given time after the pulse from detector 54 is received. At the end of this given time, the triggering pulse is conveyed to a driver 58 on line 59, which actuates the X-ray machine 61 by imposing a suitable electrical signal on cable 68 whenever the manual control 62 is operated.

The same short pulse from detector 54 is also passed to a second event selector device 60 which also delays it for a given and variable amount of time before producing a triggering pulse which is also conveyed to driver 58 on line 59 to actuate the X-ray machine 61. An adjustment control 62 also permits changing the time after the R-wave peak at which the selector 60 actuates the X-ray machine. Switch 65 can be opened if only single exposures are desired.

This manual control 62 may be simply a hand held unit with a button which the operator presses when he wishes to take an X-ray exposure. The cardiac synchronizer 10 will then trigger the machine 61 at the next chosen and appropriate point in the cardiac cycle set on event selector 56 and then again at the point set on selector 60. Ordinarily one point will be at systole and the other at diastole.

In every X-ray machine a definite time will elapse between the time that the machine is activated and when an actual burst occurs. With conventional methods, this delay is inconsequential but if the photograph is to be taken at a definite point in the cardiac cycle the burst itself must coincide with that point and not simply the time of the activation of the machine. This requires that the X-ray machine be activated at a time before the given point equal to this inherent time delay.

The proper time for activating the X-ray machine 61 can be simply determined by displaying on a CRT or oscilloscope screen in conjunction with the cardiac wave a pulse, or pulses, each having a width equal to this inherent delay and produced by the signal actuating the X-ray machine 61 so that the leading edge represents the time at which the X-ray machine 61 is actuated and the trailing edge the time at which the X-ray burst is actually produced. Therefore, the operator of the machine 61 can visually select and ascertain at what point, or points in the cycle the actual exposures will be taken by setting the trailing edge of this pulse, hereforth called the d pulse, on the vent.

In this embodiment, the d pulse is produced by pulse generator 66 and has a given adjustable width. The generator 66 is activated by the production of the triggering pulses by both the event selectors 56 and 60, each of which serves to activate the X-ray machine 61 via driver 58. The generator 66 is connected to the CRT screen 67 which may be of the long persistence type so that both the d pulse and the cardiac wave will appear on the screen 67 continuously before, during and after actuation of the X-ray machine 61.

To take either a single or a double exposure, the operator merely attaches the electrodes 26, 28 and 30 to the subject and applies a suitable source of electrical energy (not shown) to the synchronizer 10. The cardiac waveform shown in FIG. 1 and the d pulse produced by each R-wave peak then appear on the CRT screen 67. Of course, when switch 65 is closed two pulses will follow successively each R-wave peak and when the manual control 62 is operated, the machine 61 will be activated at the beginning of each of these pulses. Then the trailing edge of each d pulse can be merely adjusted without altering the width of the d pulse, which merely represents the inherent and unchanging delay in the X-ray machine 61, to coincide with the events at which the X-ray bursts are chosen to occur. One of the pulses is set with its trailing edge on one event, for example at the R-wave by adjusting the event selector 56. The other pulse is then set with its trailing edge on the other event, for example the T-wave. Finally, the manual control 62 is operated so that two separated successive X-ray bursts result from the signals produced by the driver 58 at the two times of the two events selected.

The synchronizer 10 can be associated with other devices to perform different functions and this capability is represented in FIG. 2 as an accessory input terminal 65 with two arrows carrying electrical signals outward and one carrying signals inward. One of the outwardly directed arrows represents a connection to a strip chart recorder which can produce a permanent record for later study of the cardiac waveform and the d pulse. Furthermore, the strip chart recorder can also be used to record the X-ray burst on the strip chart recorder by disposing an X-ray detector in the path of the X-ray bursts. The other of the outward directed arrows represents the connection to another remote display such as another oscilloscope or CRT screen.

The inwardly directed arrow represents a possible connection to a pulmonary synchronization unit which can be used to ensure that triggering of the X-ray machine occurs only at some level of inspiration, normally maximum inspiration or expiration. For example, the patent to Lusted 2,967,944 describes one such system for triggering upon some level of inspiration. Of course, many other exterior devices can be attached and these three are only exemplary.

Figure 3:
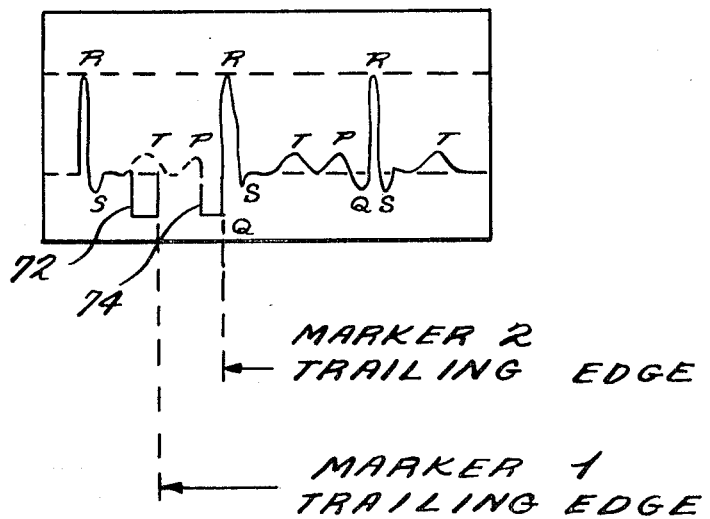
FIG. 3 shows the CRT screen of the cardiac X-ray synchronizer while the device is in operation.

Reference is now made to FIG. 3 which shows the signals which are normally displayed on CRT screen 67 during operation. In FIG. 3, the trailing edge of pulse marker 72 is set on the T-wave while the trailing edge of marker 74 is set on the R-wave peak. Of course the X-ray machine is actuated at a time coinciding with the leading edge of each of the pulses and an actual burst occurs at the trailing edge of both pulses 72 and 74. As discussed above, the position of both pulses is adjustable and an event can be selected by setting the trailing edge of one of the pulses on that event. However, it may not be desirable or even possible with at least some embodiments to set the trailing edge of pulse 74 ahead of the trailing edge of pulse 72.

Since the two X-ray bursts follow in rapid succession with no change of film or patient position, the photograph produced readily shows the actual change in heart size and the outline of the heart at both times is clearly visible. While the heart size changes could be determined by taking two separate photographs and comparing them, the comparison would be more difficult since separate and detailed measurement of each would be necessary. Moreover, unavoidable errors are inherent in a system using two separate photographs. The patient position and thus the bone structure is necessarily different even if the two photographs are taken within a few seconds of each other. The inspiration level, which to some extent effects heart size, cannot be exactly duplicated. Neither will the artifacts and other interference be exactly the same. Further, the amount of film and the operator's time both expensive items, are considerably reduced in the double exposure system possibly by half or more, thus allowing this system to be more extensively employed. Thus the double exposure system described above enables the radiologist and physician to obtain a single photograph containing a double exposure of the cardiac shadow, aorta, and pulmonary vessels. The physician can instantly see and compare two superimposed shadows with virtually no change in vascular markings or bone structure.

Many changes and modifications of the above example of the invention are possible without departing from the spirit of the invention. Accordingly, the scope of the invention is intended to be limited only by the scope of the attached claims.

What is claimed is:

1. An X-ray cardiac synchronizer for use with an X-ray machine for causing an X-ray burst to be produced at a given point in the cardiac cycle of a person disposed in the path of said burst comprising:
   means for producing an electrical signal representing the cardiac cycle,
   first means connected to said producing means for receiving said cardiac cycle representing signal and for producing a first X-ray machine actuating signal, which will cause an X-ray machine connected to said synchronizer to produce said X-ray burst, at a first given point in said cycle so as to produce a first X-ray photograph on a given sheet of X-ray sensitive material;
   second means connected to said cardiac signal producing means for receiving said cardiac cycle representing signal and for producing a second X-ray machine actuating signal, which will cause an X-ray machine connected to said synchronizer to produce an X-ray burst, at a second and different given point in said cycle so as to produce a second X-ray photograph on said given sheet in the same position as said first photograph and approximately covering said first photograph, any portions of said first photograph not covered by said second photograph or any portions and said second photograph covering regions of said sheet not in said first photograph resulting from changes in heart size occuring between said first and second points; and means for connecting said first and second means to an X-ray machine for coupling said first and second actuating signals to that X-ray machine.

2. A synchronizer as in claim 1 wherein one of said photographs is taken at diastole and the other of said photographs is taken at systole.

3. A synchronizer as in claim 1 wherein said first and second means each includes means for applying an actuating signal to said X-ray machine so as to produce an X-ray burst a given time after a chosen portion of said cycle is received and means for varying said given time and including means for receiving the electrical wave form representing said cardiac cycle of said person, means for producing a pulse beginning each time said machine is actuated and when said burst is produced, so that the time of occurrence of the trailing edge of said pulse coincides with the time of production of said burst, and means for displaying said pulse and said waveform as a function of time.

4. A synchronizer as in claim 3 wherein said chosen portion is the R-wave peak of said cycle.

5. A synchronizer as in claim 3 including means for adjusting the width of said pulse.

6. A synchronizer as in claim 3 including an X-ray machine and means connecting said X-ray machine to said first and second means.

7. A synchronizer as in claim 3 including means connected to said receiving means for inverting said waveform and wherein said receiving means includes a plurality of electrodes attachable to said person.

8. A synchronizer as in claim 3 wherein said receiving means includes means for producing the electrical waveform representing said cycle and means connected to said producing means for amplifying said electrical waveform and including manual operated means for causing said actuating means to actuate said X-ray machine.

9. A synchronizer as in claim 8 including a first housing containing said receiving means and a second housing containing said first means, said second means, said pulse producing means and said displaying means.

10. A method of obtaining a double-exposure of an X-ray photograph of the heart comprising the steps of:
    producing the electrical waveform representing the cardiac cycle of said heart;
    producing a first signal at a first given point in the cardiac cycle of a person disposed in the path of X-rays from an X-ray machine;
    applying said first signal to an X-ray machine so as to produce an X-ray burst and accordingly to produce a first X-ray photograph on a given sheet of X-ray sensitive material; and
    producing a second signal at a second and
    applying said second signal to said machine so as to produce an X-ray burst and accordingly to produce a second X-ray photograph on said given sheet in the same position as said first photograph and approximately covering said first photograph, any portions of said first photograph not covered by said second photograph and any portions of said second photograph covering regions of said sheet not in said first photograph resulting from changes in heart size occurring between said first and second points.

11. A method as in claim 10 including the steps of producing an electrical pulse beginning each time said machine is actuated and having a duration equal to the time between when said machine is actuated and when said burst is produced so that the time of occurrence of the trailing edge of said pulse coincides with the time of production of said burst producing an electrical waveform representing said cardiac cycle and displaying said waveform and said pulse.

* * * * *